US012055942B1

(12) United States Patent
Gogna et al.

(10) Patent No.: US 12,055,942 B1
(45) Date of Patent: Aug. 6, 2024

(54) VALIDATING STOPPING BEHAVIORS OF A VEHICLE

(71) Applicant: Zoox, Inc., Foster City, CA (US)

(72) Inventors: Ravi Gogna, San Jose, CA (US); Arian Houshmand, Mountain View, CA (US)

(73) Assignee: Zoox, Inc., Foster City, CA (US)

( * ) Notice: Subject to any disclaimer, the term of this patent is extended or adjusted under 35 U.S.C. 154(b) by 259 days.

(21) Appl. No.: 17/710,819

(22) Filed: Mar. 31, 2022

(51) Int. Cl.
*G05D 1/02* (2020.01)
*G05D 1/00* (2024.01)

(52) U.S. Cl.
CPC ......... *G05D 1/0214* (2013.01); *G05D 1/0038* (2013.01); *G05D 1/0061* (2013.01); *G05D 1/0238* (2013.01); *G05D 1/0274* (2013.01)

(58) Field of Classification Search
CPC .. G05D 1/0214; G05D 1/0038; G05D 1/0061; G05D 1/0238; G05D 1/0274
USPC .......................................................... 701/26
See application file for complete search history.

(56) References Cited

U.S. PATENT DOCUMENTS

| 2021/0370989 | A1* | 12/2021 | Morimura | B60W 60/00256 |
| 2022/0163969 | A1* | 5/2022 | Li | G05D 1/0217 |
| 2022/0363291 | A1* | 11/2022 | Iwamoto | B60W 60/007 |
| 2022/0365530 | A1* | 11/2022 | Foster | B60W 60/0015 |

* cited by examiner

*Primary Examiner* — Mahmoud S Ismail
(74) *Attorney, Agent, or Firm* — Lee & Hayes, P.C.

(57) ABSTRACT

Techniques for validating and correcting teleoperation signals for an autonomous vehicle are described herein. In some examples, a system may receive, from a remote computing device, an instruction to stop movement of an autonomous. The system may determine, based at least in part on map data, that the instruction is associated with stopping the autonomous vehicle in a non-stopping area. In response to determining that the instruction is associated with stopping the autonomous vehicle in the non-stopping area, the system may determine to continue movement of the autonomous vehicle beyond the no-stopping area. The system may further identify a stopping location that is at least partially outside of the no-stopping area and control the autonomous vehicle to instead stop at the stopping location.

20 Claims, 5 Drawing Sheets

VALIDATING STOPPING BEHAVIORS OF A VEHICLE

BACKGROUND

Vehicles operate in dynamic environments in which conditions are often changing. Among the changing conditions are moving objects, road blockages due to construction, accidents, and the like. Vehicles may be programmed to react to the changing conditions, while maintaining the vehicle within a designated operations protocol. Additionally, vehicles may be configured to receive and react to control signals from remote operators, such as those configured to provide assistance to the vehicle in the changing conditions. For example, a vehicle may receive, from a remote computing device, an instruction to stop movement of the vehicle operating in an environment based on detecting a hazardous object. However, in certain situations, the instruction may cause the vehicle to be stopped in an undesirable area (e.g., a no-stopping area), such as in an intersection, which can be potentially dangerous for the vehicle and disruptive to other vehicles in the environment.

BRIEF DESCRIPTION OF THE DRAWINGS

The detailed description is described with reference to the accompanying FIGURES. In the FIGURES, the left-most digit(s) of a reference number identifies the figure in which the reference number first appears. The use of the same reference numbers in different FIGURES indicates similar or identical components or features.

DETAILED DESCRIPTION

Figure 1:
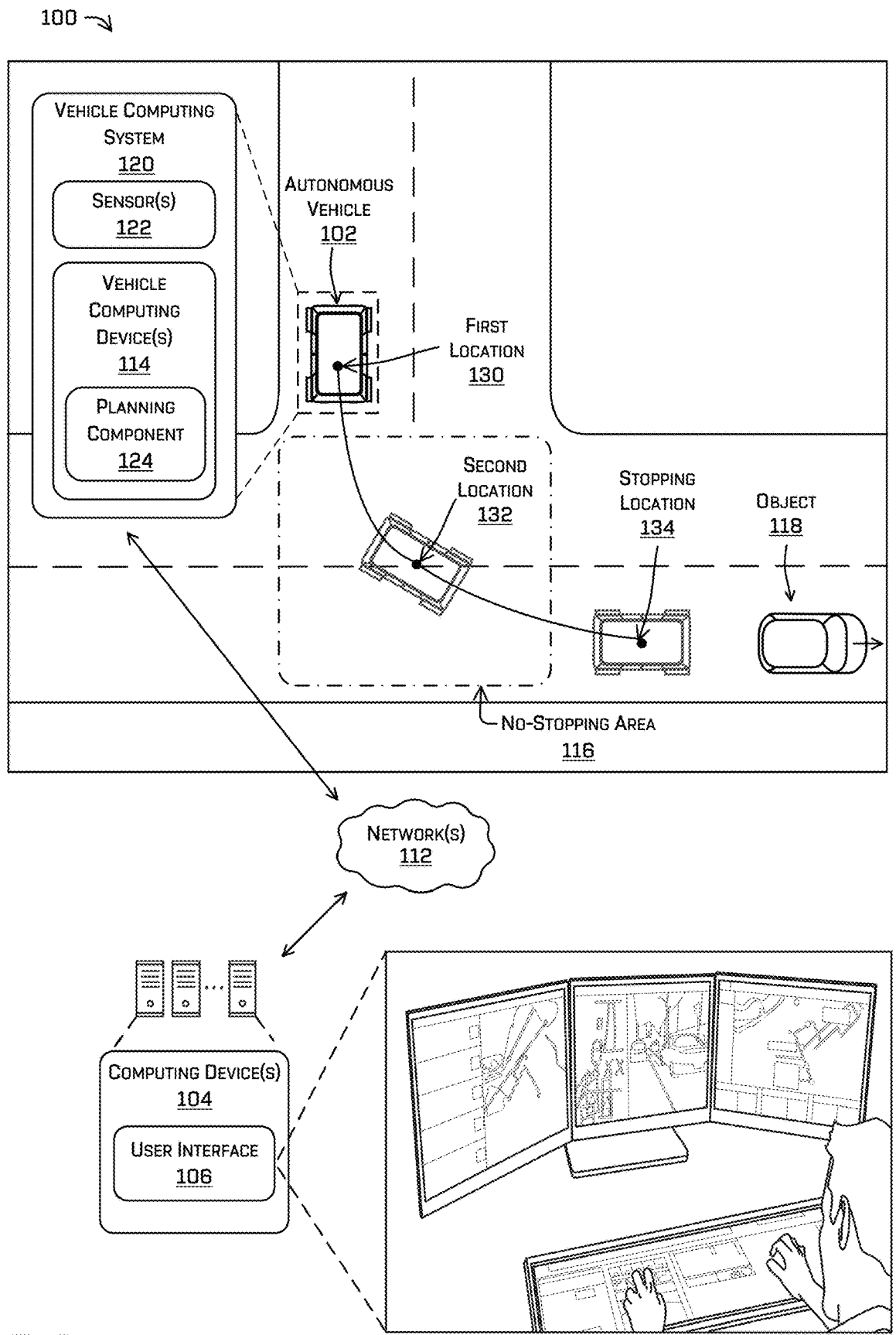
FIG. 1 illustrates a schematic diagram of an example environment through which an example vehicle travels while in communication with a remote operator.

A vehicle may receive an instruction to stop movement of the vehicle from a remote entity to keep the vehicle away from a hazardous object, such as a truck with rebars sticking out of the back of the truck, a traffic cone, a hazard road sign, fencing, a double-parked vehicle, or the like. However, in certain situations, the instruction may result in the vehicle to stopping in an area (e.g., no-stopping area) that is undesirable for the vehicle to stop, such as in an intersection, blocking an onramp or offramp, blocking an entrance to a parking lot, and/or the like. For example, in a high internet latency situation, the vehicle may wait for an amount of time to receive the instruction and the instruction may consequently cause the vehicle to stop at a junction and block the flow of traffic.

This disclosure is directed to techniques for validating and correcting stopping signals for vehicles that are received from a remote operator via a remote computing device (e.g., remote operator computing device associated with the remote operator).

In some examples, a system may receive, from a remote computing device associated with a remote operator, an instruction to stop movement of an autonomous vehicle operating in an environment (e.g., a stopping signal). In various examples, the instruction may include steering, braking, and/or deceleration information as non-limiting examples, though other controls (of internal and/or external components) of the autonomous vehicle are contemplated. In some examples, the system may determine, by a controller of the autonomous vehicle, and based at least in part on map data associated with the environment, that the instruction is associated with stopping the autonomous vehicle in a no-stopping area that is designated, in the map data, as including a drivable surface. Non-limiting examples of a no-stopping area include a junction, a crosswalk, a railroad crossing, a construction zone, a fire lane, an onramp or offramp entrance or exit, an entrance to a parking lot, a bus lane, and/or the like. In response to determining that the instruction is associated with stopping the autonomous vehicle in the no-stopping area, the system may determine to continue movement of the autonomous vehicle. The system may further identify a stopping location that is at least partially outside of the no-stopping area and control the autonomous vehicle to instead stop at the stopping location.

In some examples, the system may determine the no-stopping area based at least in part on map data associated with the environment. For example, map data may include map elements such lane marking, lane boundaries, one or more lane references (e.g., a centerline associated with a lane and/or a route between available (e.g., legal) lanes). Additional examples of map elements can include, but are not limited to, one or more of a lane element, a bike lane element, a bus lane element, a crosswalk element, a junction (e.g., intersection) element, a railroad crossing element, a fire lane element, a lane divider element, a traffic light element, a stop sign element, a stop line element, a yield sign element, a yield line element, a parking lane element, a driveway or parking lot entrance element, a speed bump element, jay walking regions (e.g., a virtual crosswalk), trajectory waypoints (e.g., known trajectories), passenger pickup points, a sign location element, a geofence element, construction zone element (e.g., for long-standing or non-temporary construction zones), and the like.

In at least one example, the no-stopping area may be indicated in the map data, such as an area designated for continued operation (e.g., no stopping zone, emergency stop only). In such examples, the system may determine the no-stopping area based on designations included in the map data. Additionally or alternatively, in some examples, the system may determine the no-stopping area based on map data and sensor data of an environment. For example, the autonomous vehicle may be equipped with various sensors for generating sensor data associated with the autonomous vehicle's surroundings. In another example, the autonomous vehicle may receive sensor data from one or more remote sensors mounted in an environment of the autonomous vehicle (e.g., sensors mounted in the environment, sensors on other vehicles, etc.). Such sensor data may indicate a no-stopping area.

In some examples, the system may determine that the instruction is associated with stopping the autonomous vehicle in the no-stopping area based on a location, a speed associated with the vehicle when the instruction is received, and a deceleration rate associated with stopping the vehicle.

For example, the system may determine a first location and a speed associated with the autonomous vehicle when a stopping signal is received. The system may further determine a second location associated with stopping the autonomous vehicle (e.g., a stopping location) based on the first location, the speed, and a deceleration rate. Based at least in part on map data and/or sensor data of the environment, the system may determine whether the instruction is associated with stopping the autonomous vehicle in the no-stopping area. In at least one example, the system may determine that the instruction is associated with stopping the autonomous vehicle in the no-stopping area based on a determination that at least a portion of the vehicle is located within the no-stopping area when stopped at the second location. For example, if a position and/or orientation of the vehicle at the second location causes a portion of the vehicle to be located within the no-stopping area, the system may determine that the instruction is associated with stopping the autonomous vehicle in the no-stopping area.

In some examples, determining the instruction is associated with stopping the vehicle in the no-stopping area is further based at least in part on a latency associated with one or more messages from the remote computing device. For example, the system may receive, from the remote computing device, one or more messages in a period of time (e.g., one minute, two minutes, five minutes, etc.) prior to receiving the instruction to stop the vehicle. The system may store one or more latencies of the one or more messages and may determine an average latency associated with the one or more messages based on the one or more latencies of the one or more messages. The system may further compare the average latency associated with the one or more messages with a latency threshold. If the average latency is greater than or equal to the latency threshold, the system may determine that one or more actions performed by the vehicle may be delated from when an instruction is commanded and an instruction may (inadvertently) be associated with stopping the vehicle in the no-stopping area The system may determine whether the instruction is associated with stopping the autonomous vehicle in the no-stopping area based, in addition to a latency, on a location, a speed associated with the vehicle when the instruction is received, and a deceleration rate associated with stopping the vehicle as described above.

In some examples, in response to determining that the instruction is associated with stopping the autonomous vehicle in the no-stopping area, the system may generate a message indicating that the instruction is associated with the no-stopping area. In at least one example, the message may provide an indication to the remote operator indicating that the instruction is associated with stopping the vehicle in a no-stopping area and that the vehicle will continue movement to stop outside the no-stopping area. That is, the message may inform the remote operator as to why the vehicle is not ceasing movement immediately in response to the stopping signal. As an illustrative example, the system may generate a message that reads, "the instruction is associated with a junction, and the autonomous vehicle is going to continue movement to avoid stopping in the junction." The system may send the message to the remote computing device associated with the remote operator and cause the message to be presented on a display of the remote computing device.

In at least one example, in response to determining the instruction is associated with stopping the autonomous vehicle in the no-stopping area, the system may identify a stopping location that is at least partially outside of the no-stopping area. The system may generate a vehicle trajectory from a current location of the vehicle to the stopping location. In various examples, the system can generate the vehicle trajectory based on the sensor data. In some examples, the system can generate the vehicle trajectory based on objects detected in the environment, such as based on the sensor data. In at least one example, the system can utilize data associated with a detected object in a vehicle trajectory determination (e.g., vehicle control considerations) based on a determination that the detected object is relevant to the vehicle.

In some examples, the system may determine relevance of an object utilizing techniques such as those described in U.S. patent application Ser. No. 16/389,720, filed Apr. 25, 2019 and entitled "Dynamic Object Relevance Determination", Ser. No. 16/417,260, filed Mar. 14, 2019 and entitled "Object Relevance Determination", Ser. No. 16/530,515, filed Aug. 1, 2019 and entitled "Relevant Object Detection", Ser. No. 17/117,641, filed Dec. 17, 2020 and entitled "Velocity-Based Relevance Filter", the entire contents of each application are incorporated herein by reference for all purposes. In at least one example, the system may determine a predicted object trajectory associated with the object and may determine the relevance of the object based on the object trajectory. In at least one example, the system may determine the object trajectory utilizing techniques such as those described in U.S. patent application Ser. No. 16/151,607 filed Oct. 4, 2018 and entitled "Trajectory Prediction on Top-Down Scenes," and Ser. No. 15/807,521 filed Nov. 8, 2017 and entitled "Probabilistic Heat Maps for Behavior Prediction," the entire contents of both applications are incorporated herein by reference for all purposes. Based at least in part on a determination that the object traveling on the object trajectory is relevant to the autonomous vehicle, the system may determine an area associated with the object. In at least one example, the area may represent a space in the environment that is occupied by the object and/or will be occupied by the object at a time in the future. The system may generate, based at least in part on the no-stopping area and the area associated with the object, a vehicle trajectory from a first location (e.g., a current location of the autonomous vehicle) to the stopping location. The system may further control the autonomous vehicle based at least in part on the vehicle trajectory.

In some examples, the system may generate another vehicle trajectory based on determining an object indicated in the sensor data is an unclassified or classified hazardous object. In some examples, the system may determine the object indicated in the sensor data is a classified hazardous object, optionally based on map data. For example, the system may classify the object indicated in the sensor data as a classified hazardous object based on map data, log data, machine learned models trained via log data, and/or the like. In some examples, the system may classify the object indicated in the sensor data is an unclassified object. An unclassified object can include an object in which at least a portion of the object is unidentifiable or identified with a low confidence classification by the classifier of the system. For example, a car with a mattress mounted on the roof may modify a shape of the car such that it is unidentifiable or identified with a low confidence classification to the classifier. As such, the system may determine that the object is an unclassified object. For another example, a vehicle may have an additional object, such as wood, rebar, or the like protruding from a portion of the vehicle. Such objects may alternatively be classified as being or containing hazardous objects. In examples, the system may determine that the protrusion (e.g., the additional object) is unidentifiable or identified with a low confidence classification and may render the object unclassified or that the protruding objects are hazardous. In response to determining that the object is an unclassified object or a classified hazardous object, the system may generate an expanded area based on the area associated with the object. The system may further generate the vehicle trajectory based on the expanded area and control the autonomous vehicle based on the vehicle trajectory.

The techniques discussed herein may improve safe operation of an autonomous vehicle by validating and correcting stopping signals received from a remote operator of the vehicle. As discussed above, traditionally, an autonomous vehicle receives an instruction to stop from a remote computing device associated with a remote operator and responds to the instruction by immediately stopping the vehicle. However, based on where the instruction is received, stopping the vehicle right away may cause the vehicle to stop in an undesirable location, such as in the middle of an intersection blocking traffic. The techniques described herein include identifying that a stopping signal received from a remote operator is associated with a no-stopping area and controlling the vehicle to a stop outside of the no-stopping area, such as to improve the safe operation of the vehicle and to avoid disrupting the flow of traffic in the environment of the vehicle. These and other improvements to the functioning of the autonomous vehicle are discussed herein.

The techniques described herein may be implemented in a number of ways. Example implementations are provided below with reference to the following FIGURES. Although discussed in the context of an autonomous vehicle, the methods, apparatuses, and systems described herein may be applied to a variety of systems (e.g., a manually driven vehicle, a sensor system, or a robotic platform), and are not limited to autonomous vehicles. For example, the techniques described herein may be implemented with semi-autonomous vehicles. In another example, the techniques may be utilized in an aviation or nautical context, or in any system using machine vision (e.g., in a system using image data). In one example, similar techniques may be utilized in driver-controlled vehicles in which such a system may provide an indication of whether it is safe to perform various maneuvers.

FIG. 1 illustrates a schematic diagram of an example environment 100 through which an example autonomous vehicle 102 travels while in communication with a remote operator.

As depicted in FIG. 1, the autonomous vehicle 102 may operate in the environment 100. In various examples, a vehicle computing system 120 may be configured autonomously control the vehicle 102 through the environment 100. In at least one example, the vehicle computing system 120 may be configured to request assistance and/or validation of operations from a remote operator. In such an example, the vehicle computing system 120 may establish a connection with one or more remote computing device(s) 104 associated with the remote operator. In some examples, the remote operator associated with the remote computing device(s) 104 may receive sensor data associated with the environment 100 (e.g., sensor data indicating an object 118 in the environment 100) and based on the object 118, may send an instruction to stop movement of the autonomous vehicle 102 operating in the environment 100, such as cause the vehicle to avoid the object 118 (e.g., remain a threshold distance from the object 118). As an example, the remote operator may identify the object 118 to be a truck with rebars protruding from the back of the truck and may send an instruction to stop movement of the autonomous vehicle 102, such as to avoid the autonomous vehicle 102 getting too close to the truck.

In some examples, the sensor data indicating the object 118 may be received from one or more sensor(s) 122 mounted on the autonomous vehicle 102, and include, without limitation, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, and the like. For example, the vehicle computing system 120 may receive sensor data of the environment 100 from one or more dashcams mounted on the autonomous vehicle 102, and the sensor data may indicate a hazardous object, such as a vehicle with a protruding object, a traffic cone, a hazard road sign, fencing, a double-parked vehicle, and/or the like. The vehicle computing system 120 may send the sensor data to the remote computing device 104, and the remote computing deceive 104 may generate the instruction to stop movement of the autonomous vehicle 102 based at least in part on the sensor data.

In some examples, the sensor data may be received from one or more remote sensors, such as, for example, sensors mounted on one or more other vehicles and/or sensors mounted in the environment 100. For example, one or more remote sensors may be mounted in the environment 100 to provide additional visibility in an area of reduced visibility, such as, for example, in a blind or semi-blind intersection. In an example, the remote computing device 104 may receive sensor data of the environment 100 from one or more traffic monitoring cameras mounted at an intersection, and the sensor data may indicate a hazardous object.

The vehicle computing system 120 may determine, based at least in part on map data associated with the environment 100, whether the instruction is associated with stopping the autonomous vehicle 102 in a no-stopping area 116. The no-stopping area 116 is designated, in the map data, as including a drivable surface. In some examples, the no-stopping area 116 may include a junction, a crosswalk, a railroad crossing, a construction zone, a fire lane, an onramp or offramp entrance or exit, an entrance to a parking lot, a bus lane, and/or the like. In some examples, the vehicle computing system 120 may determine the no-stopping area 116 based at least in part on sensor data of the environment 100 (e.g., sensor data received from one or more sensors associated with the autonomous vehicle, sensor data received from one or more remote sensors mounted in an environment of the autonomous vehicle, etc.), log data indicative of no-stopping areas, and/or map data.

In some examples, the vehicle computing system 120 may determine whether the instruction is associated with stopping the autonomous vehicle 102 in a no-stopping area based on a location and a speed associated with the autonomous vehicle 102, and a deceleration rate. For instance, the vehicle computing system 120 may determine a first location 130 (e.g., a current location) associated with the autonomous vehicle 102 based on data received from one or more location sensors (e.g., GPS, compass, etc.). The vehicle computing system 120 may determine a current vehicle speed of the autonomous vehicle 102. The vehicle computing system 120 may further determine, based on the first location 130, the vehicle speed, and a deceleration rate, a second location 132 associated with stopping the autonomous vehicle 102. In some examples, the deceleration rate may be a constant deceleration rate. In some examples, the deceleration rate may be a varied deceleration rate, such that the deceleration rate increases or decreases as the vehicle slows. In various examples, the deceleration rate(s) can be predetermined, such as that stored in the vehicle computing system 120 to be applied upon receiving an instruction to stop from a remote operator. In some examples, the vehicle computing system 120 may determine the deceleration rate based on one or more conditions, such as weather conditions, road conditions, etc. For example, the vehicle computing system 120 may determine to apply a lower rate of deceleration in icy conditions, such as to reduce slip.

In some examples, the vehicle computing system 120 may further determine whether the instruction is associated with stopping the autonomous vehicle 102 in the no-stopping area based on a latency associated with one or more messages received from the remote computing device(s) 104. For example, the vehicle computing system 120 may receive, from the remote computing device(s) 104, one or more messages in a period of time (e.g., one minute, two minutes, five minutes, etc.) prior to receiving the instruction to stop the autonomous vehicle 102. The vehicle computing system 120 may store data associated with transmission time(s) (e.g., time(s) between sending and receiving the message(s) of the one or more messages and may determine an average latency associated with the one or more messages based on the transmission time(s). The vehicle computing system 120 may further compare the average latency associated with the one or more messages with a latency threshold. If the average latency is greater than or equal to the latency threshold, the vehicle computing system 120 may determine that the instruction may be associated with stopping the autonomous vehicle 102 in the no-stopping area 116 (e.g., inadvertently, due to the latency, etc.).

In at least one example, the vehicle computing system 120 determines whether the second location 132 is associated with stopping the autonomous vehicle 102 in the no-stopping area 116. In some examples, vehicle computing system 120 may determine that the second location 132 is associated with the no-stopping area 116 based on a determination that at least a portion of the autonomous vehicle 102 is located within the no-stopping area 116 at the stopped location 132. In at least one example, the vehicle computing system 120 may determine a position and/or orientation of the autonomous vehicle 102 at the second location 132, and may determine if the position and/or orientation of the autonomous vehicle 102 results in at least the portion of the autonomous vehicle 102 being located in the no-stopping area 116.

Based on a determination that the second location 132 is not associated with the no-stopping area 116, the vehicle computing system 120 may determine that the instruction is not associated with stopping the autonomous vehicle 102 in the no-stopping area 116. In response to determining that the instruction is not associated with stopping the autonomous vehicle 102 in the no-stopping area 116, the vehicle computing system 120 may control the autonomous vehicle 102 to stop movement based on the instruction received from the remote computing device 104. In some examples, the instruction may include a steering control, a braking control, and/or deceleration control configured to stop the autonomous vehicle 102 at least a threshold distance from the object 118.

Based on a determination that the second location 132 is associated with the no-stopping area 116, the vehicle computing system 120 may determine that the instruction is associated with stopping the autonomous vehicle 102 in the no-stopping area 116. In response to determining that the instruction is associated with stopping the autonomous vehicle 102 in the no-stopping area 116, the vehicle computing system 120 may determine to continue movement of the autonomous vehicle 102. In at least one example, a planning component 124 of the autonomous vehicle 102 may identify a stopping location 134 that is at least partially outside of the no-stopping area 116. In response to identifying the stopping location 134, the vehicle computing system 120 may control the autonomous vehicle 102 to stop at the stopping location 134.

In some examples, in response to determining that the instruction is associated with stopping the autonomous vehicle 102 in the no-stopping area 116, the vehicle computing system 120 may generate a message to send to the remote operator (e.g., the remote computing device(s) 104. In some examples, the message may indicate that the instruction is associated with stopping the autonomous vehicle 102 in the no-stopping area 116 and that the autonomous vehicle 102 is going to continue movement to a location that is at least partially outside of the area no-stopping area 116 (e.g., stopping location 134). In at least one example, the message may inform the remote operator why the autonomous vehicle 102 is not stopping immediately in response to receiving the instruction.

In various examples, the vehicle computing system 120 may send the message to the remote computing device 104(s) via a network(s) 112. In at least one example, the remote computing device(s) 104 may include a user interface 106 via which the message may be presented. That is, the vehicle computing system 120 may cause the remote computing device(s) 104 to present the message via the user interface 106. For example, the vehicle computing system 120 may cause the remote computing device(s) 104 to present a message that reads "the vehicle shouldn't stop in a junction, so the autonomous vehicle is going to continue movement and stop outside of the junction." As another example, the vehicle computing system 120 may generate a message including an indication of the stopping location 134 that is at least partially outside of the no-stopping area 116, and may cause the indication of the stopping location 134 to be displayed with a map on the user interface 106 of the remote computing device(s) 104.

Figure 2:
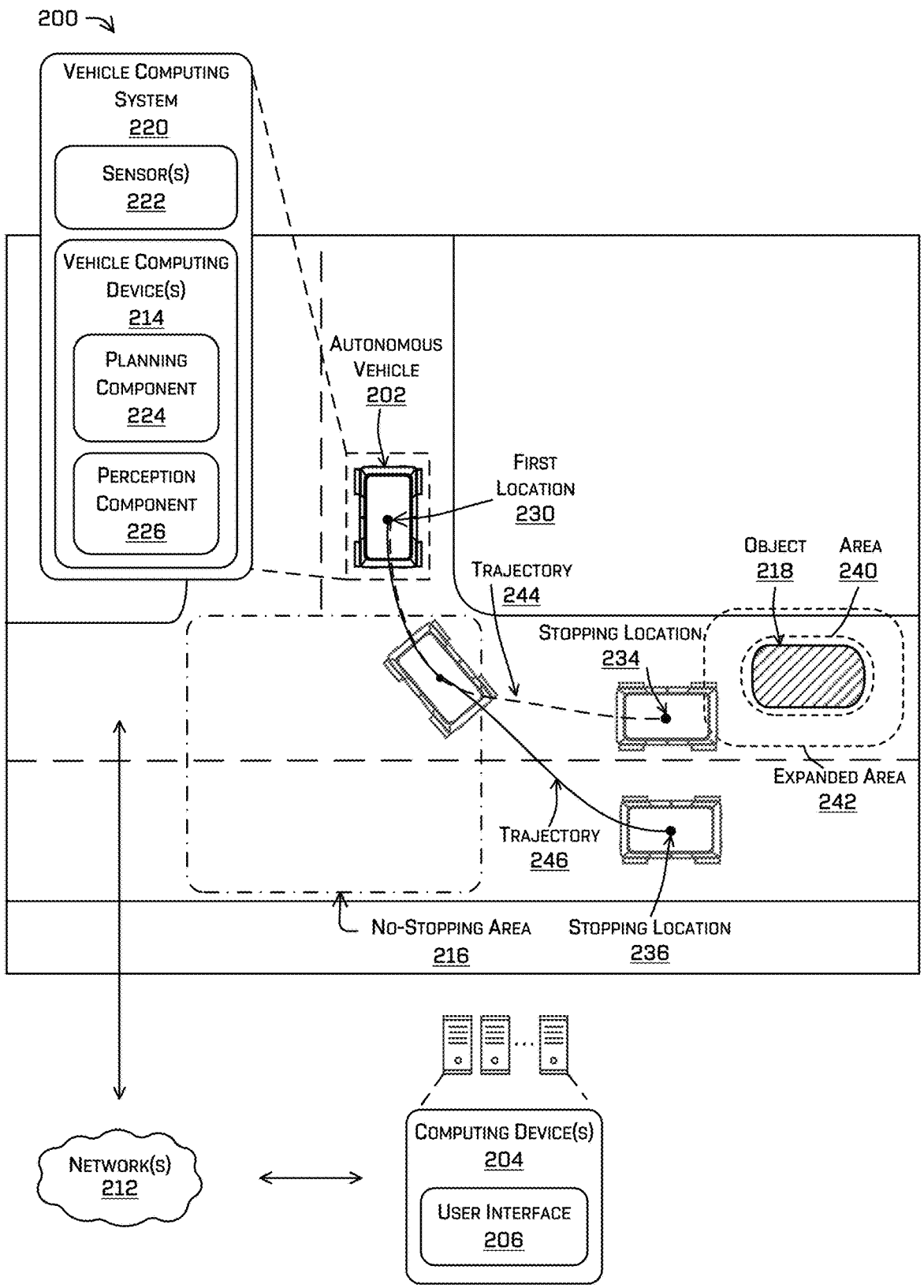
FIG. 2 illustrates another schematic diagram of an example environment through which an example vehicle travels while in communication with a remote operator.

FIG. 2 illustrates another schematic diagram of an example environment 200 through which an example autonomous vehicle 202 travels while in communication with a remote operator.

As shown in FIG. 2, the autonomous vehicle 202 may operate in the environment 200 and may identify an object 218 that impedes operation of the autonomous vehicle 202 (e.g., is in a planned path of the autonomous vehicle 202). As an illustrative example, the first lane associated with a planned path of the autonomous vehicle 202 may be blocked by one or more dynamic and/or static objects, such as a vehicle with a protruding object, a traffic cone, a hazard road sign, fencing, a double-parked vehicle, or the like. In some examples, a vehicle computing system 220 of the autonomous vehicle 202 may be configured to navigate around the object 218, such as without assistance from a remote operator.

In at least one example, the vehicle computing system 220 may determine that assistance from a remote operator may be desired, such as to ensure safe operation of the autonomous vehicle 202 while circumnavigating the object 218. In such an example, the vehicle computing system 220 may establish a connection with one or more remote computing device(s) 204, such as remote computing device(s) 104, such as to receive input from a remote operator associated therewith. In some examples, a remote operator associated with one or more remote computing device(s) 204 has active control of the autonomous vehicle 202 and proactively provides guidance. The remote operator associated with one or more remote computing device(s) 204 may identify the object 218 based on sensor data associated with the environment 200, and may send, to the vehicle computing system 220, an instruction to stop movement of the autonomous vehicle 202. In some examples, the remote operator may be a human remote operator located at a teleoperations center, at a location in the environment 200 in view of the autonomous vehicle 202, and/or at another remote location(s). In some examples, the remote operator may include a computer system configured to leverage artificial intelligence, machine learning, and/or other decision-making strategies to assist in the operation of the autonomous vehicle 202.

As discussed in detail above, the autonomous vehicle 202 may determine that the instruction received from one or more remote computing device(s) 204 is associated with stopping the autonomous vehicle 202 in a no-stopping area 216. Based on determining that the instruction is associated with stopping the autonomous vehicle 202 in the no-stopping area 216, the vehicle computing system 220 may generate a trajectory 244 configured to guide the autonomous vehicle 202 from a first location 230 (e.g., a current location) to a stopping location 234 that is at least partially outside of the no-stopping area 216.

In some examples, the autonomous vehicle 202 may generate the trajectory 244 based on sensor data representative of the environment 200 of the autonomous vehicle 202. For instance, a perception component 226 may determine, based at least in part on sensor data representative of the environment 200 of the autonomous vehicle 202, an object trajectory associated with the object 218 operating in the environment 200. The perception component 226 may further determine an area 240 associated with the object 218 based at least in part on a determination that the object 218 traveling on the object trajectory is relevant to the autonomous vehicle 202. For example, based on the sensor data representative of the environment 200 of the autonomous vehicle 202, the perception component 226 may determine an object size associated with the object 218. The perception component 226 may further generate the area 240 on a map, which indicates the size and/or shape of the object 218 (e.g., dimensions, such as one or more lengths, widths, and/or heights associated with the object 218). The planning component 224 may generate, based at least in part on the no-stopping area 216 and the area 240 associated with the object 218, the vehicle trajectory 244 from the first location 230 of the autonomous vehicle 202 to the stopping location 234. The vehicle computing system 220 may further control the autonomous vehicle 202 to travel from the first location 230 to the stopping location 234 based at least in part on the vehicle trajectory 244.

In some examples, the autonomous vehicle 202 may generate a trajectory 246 based on determining that the object 218 is an unclassified or classified hazardous object. In some examples, the vehicle computing system 220 may determine that the object 218 is a classified hazardous object based on log data, machine learned models, and/or the like. For example, the vehicle computing system 220 may determine the object 218 is a traffic cone and a classifier of the system configured to classify the object 218 to be a classified hazardous object based on log data.

In some examples, the vehicle computing system 220 may determine that the object 218 is an unclassified object. An unclassified object can include an object in which at least a portion of the object is unidentifiable and/or identified with a low confidence classification by the classifier of the vehicle computing system 220 (e.g., associated with the perception component 226). For example, a car with a mattress mounted on the roof may modify a size and/or shape of the car such that it is unidentifiable to the classifier and/or identified with a low confidence classification by the classifier. As such, the system may determine that the object is an unclassified object. For another example, a vehicle may have an additional object, such as wood, rebar, or the like protruding from a portion of the vehicle. The system may determine that the protrusion (e.g., the additional object) is unidentifiable and may render the object unclassified.

Based on a determination that the object 218 is an unclassified object or is classified as a hazardous object, the perception component 226 may determine an expanded area 242 based on the area 240 associated with the object 218. In one example, the expanded area 242 may be a percentage larger than the area 240. In some examples, the expanded are 212 may be a threshold measurement and/or percentage larger than the detected dimensions of the object 218. As an example, the object 218 may be a vehicle with a protruding object, and the perception component 226 may determine the object 218 to be an unclassified object based on the protrusion (e.g., based on the dimensions associated with the object do not match known classifiers). Based on determining that the object 218 is an unclassified object and/or classified as a hazardous object, the perception component 226 may generate the expanded area 242 to ensure safe operation of the autonomous vehicle 202 at least a threshold distance from the object 218 and/or the protrusion.

In some examples, the planning component 224 may generate, based at least in part on the no-stopping area 216 and the expanded area 242 associated with the object 218, the vehicle trajectory 246 from the first location 230 of the autonomous vehicle 202 to a stopping location 236 that is at least partially outside of the no-stopping area 216. The vehicle trajectory 246 is unassociated with the expanded area 242 and at least partially outside of the no-stopping area 216, which helps to improve safe operation of the autonomous vehicle 202.

In some examples, the vehicle computing system 220 may further generate a message indicating that the trajectory 244 and/or the trajectory 246. In at least one example, the message may provide an indication of why the autonomous vehicle 202 continued operation after receiving an instruction to stop from the remote operator and/or an indication of why the vehicle computing system 220 selected the trajectory 246 to follow, such as in lieu of vehicle trajectory 244. The vehicle computing system 220 may send the message to the remote computing device 204 via a network(s) 212, and a user interface 206 will output the message. For example, the vehicle computing system 220 may cause the trajectory 244 and/or the trajectory 246 to be displayed with a map on the user interface 106 of the remote computing device 104.

Figure 3:
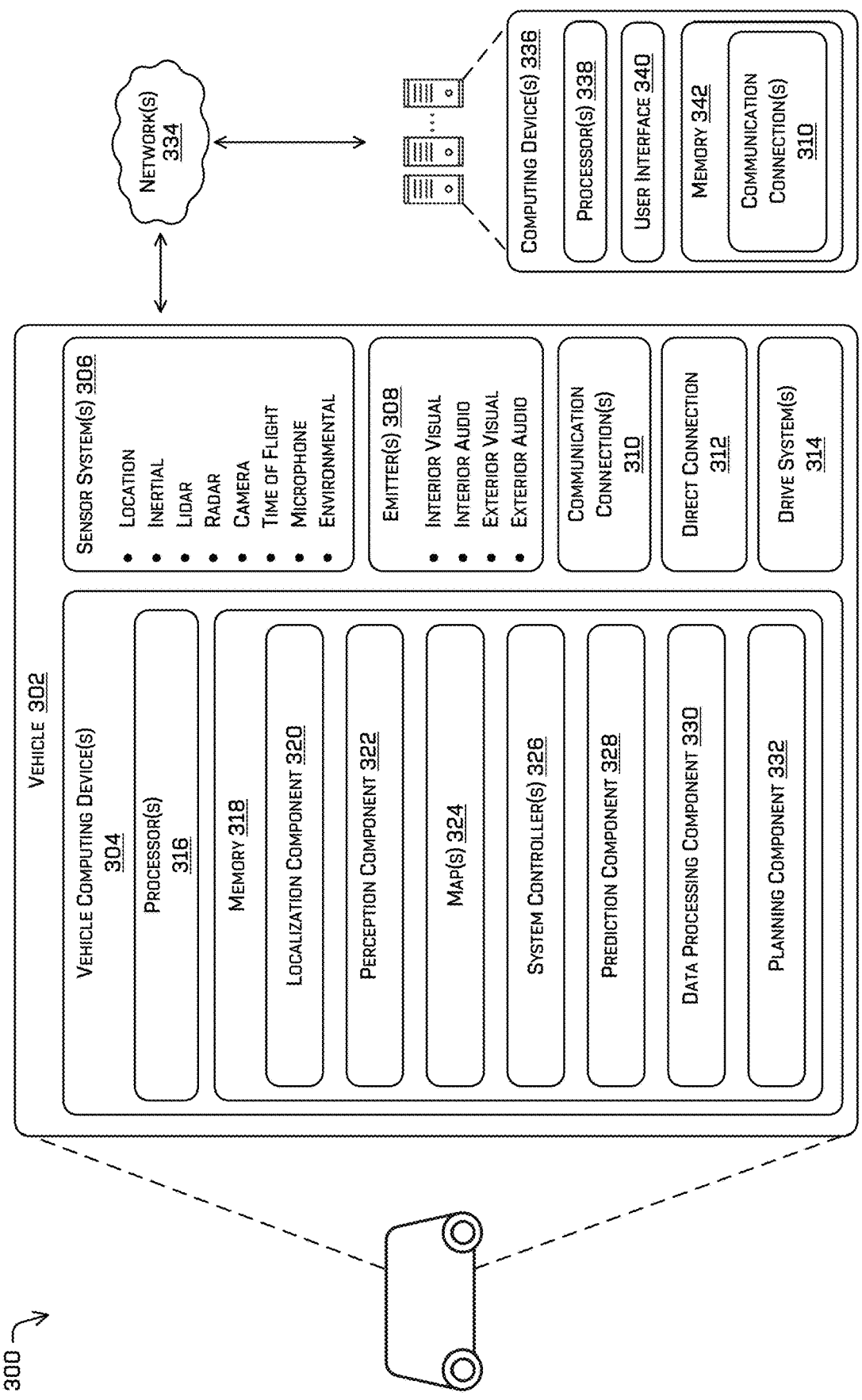
FIG. 3 is a block diagram illustrating an example system for implementing some of the various technologies described herein.

FIG. 3 depicts a block diagram of an example system 300 for implementing the techniques described herein. In at least one example, the system 300 can include a vehicle 302, which can correspond to the autonomous vehicle 102 of FIG. 1 and/or the autonomous vehicle 202 of FIG. 2.

The example vehicle 302 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 302 can be configured to control all functions from start to completion of the trip, including all parking functions, it may not include a driver and/or controls for driving the vehicle 302, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 302 can include vehicle computing device(s) 304, one or more sensor systems 306, one or more emitters 308, one or more communication connections 310, at least one direct connection 312, and one or more drive systems 314.

The vehicle computing device(s) 304 can include one or more processors 316 and memory 318 communicatively coupled with the one or more processors 316. In the illustrated example, the vehicle 302 is an autonomous vehicle; however, the vehicle 302 could be any other type of vehicle or robotic platform. In the illustrated example, the memory 318 of the vehicle computing device(s) 304 stores a localization component 320, a perception component 322, such as perception component 226, one or more maps 324, one or more system controllers 326, a prediction component 328, a data processing component 330, and a planning component 332, such as planning component 124 and/or planning component 224. Though depicted in FIG. 3 as residing in the memory 318 for illustrative purposes, it is contemplated that the localization component 320, the perception component 322, the one or more maps 324, the one or more system controllers 326, the prediction component 328, the data processing component 330, and the planning component 332 can additionally, or alternatively, be accessible to the vehicle 302 (e.g., stored on, or otherwise accessible by, memory remote from the vehicle 302).

In at least one example, the localization component 320 can include functionality to receive data from the sensor system(s) 306 to determine a position and/or orientation of the vehicle 302 (e.g., one or more of an x-, y-, z-position, roll, pitch, or yaw). For example, the localization component 320 can include and/or request/receive a map of an environment and can continuously determine a location and/or orientation of the autonomous vehicle within the map. In some instances, the localization component 320 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 320 can provide data to various components of the vehicle 302 to determine an initial position of an autonomous vehicle for generating a trajectory and/or for determining that an object is proximate to one or more crosswalk regions and/or for identifying candidate reference lines, as discussed herein.

In some instances, and in general, the perception component 322 can include functionality to perform object detection, segmentation, and/or classification. In some examples, the perception component 322 can provide processed sensor data that indicates a presence of an object that is proximate to the vehicle 302 and/or a classification of the object as an object type (e.g., car, pedestrian, cyclist, animal, building, tree, road surface, curb, sidewalk, stoplight, stop sign, unknown, etc.). In additional or alternative examples, the perception component 322 can provide processed sensor data that indicates one or more characteristics associated with a detected object (e.g., a tracked object) and/or the environment in which the object is positioned. In some examples, characteristics associated with an object can include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment can include, but are not limited to, a presence of another object in the environment, a state of another object in the environment, a time of day, a day of a week, a season, a weather condition, an indication of darkness/light, etc.

The memory 318 can further include one or more maps 324 that can be used by the vehicle 302 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 324 can include at least one map (e.g., images and/or a mesh).

In some examples, the vehicle 302 can be controlled based at least in part on the maps 324. That is, the maps 324 can be used in connection with the localization component 320, the perception component 322, the prediction component 328, and/or the planning component 332 to determine a location of the vehicle 302, identify objects in an environment, and/or generate routes and/or trajectories to navigate within an environment.

In some examples, the one or more maps 324 can be stored on a remote computing device(s) (such as the computing device(s) 336) accessible via network(s) 334. In some examples, multiple maps 324 can be stored based on, for example, a characteristic (e.g., type of object, time of day, day of week, season of the year, etc.). Storing multiple maps 324 can have similar memory requirements, but can increase the speed at which data in a map can be accessed.

In at least one example, the vehicle computing device(s) 304 can include one or more system controllers 326, which can be configured to control steering, propulsion, braking, safety, emitters, communication, and other systems of the vehicle 302. These system controller(s) 326 can communicate with and/or control corresponding systems of the drive system(s) 314 and/or other components of the vehicle 302.

In general, the prediction component 328 can include functionality to generate predicted information associated with objects in an environment. In some examples, the prediction component 328 can be implemented to predict locations of a pedestrian proximate to a crosswalk region (or otherwise a region or location associated with a pedestrian crossing a road) in an environment as they traverse or prepare to traverse through the crosswalk region. In some examples, the techniques discussed herein can be implemented to predict locations of objects (e.g., a vehicle, a pedestrian, and the like) as the vehicle traverses an environment. In some examples, the prediction component 328 can generate one or more predicted trajectories for such target objects based on attributes of the target object and/or other objects proximate the target object.

The data processing component 330 can include functionality to determine a cost associated with a trajectory from the planning component 332, determine whether the cost meets or exceeds a threshold cost, and determining whether to send a request for assistance based at least in part on the cost meeting or exceeding the threshold cost. In some examples, the data processing component 330 can receive data from the localization component 320, the perception component 322, and/or the planning component 332 to determine a threshold (e.g., an acceleration threshold, a velocity threshold, and/or a timing threshold) and/or a capability associated with the vehicle 302. The data processing component 330 can include functionality to receive information indicating a cost, a threshold, or other data from the computing device 336 and use the information during planning operations.

In general, the planning component 332 can determine a path for the vehicle 302 to follow to traverse the environment. For example, the planning component 332 can determine various routes and trajectories and various levels of detail. For example, the planning component 332 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 332 can generate an instruction for guiding the autonomous vehicle along at least a portion of the route from the first location to the second location. In at least one example, the planning component 332 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 302 to navigate.

In some instances, the planning component 332 can generate one or more trajectories for the vehicle 302 based at least in part on predicted location(s) associated with object(s) in an environment. In some examples, the planning component 332 can use temporal logic, such as linear temporal logic and/or signal temporal logic, to evaluate one or more trajectories of the vehicle 302.

As can be understood, the components discussed herein (e.g., the localization component 320, the perception component 322, the one or more maps 324, the one or more system controllers 326, the prediction component 328, the data processing component 330, and the planning component 332) are described as divided for illustrative purposes. However, the operations performed by the various components can be combined or performed in any other component. Further, any of the components discussed as being implemented in software can be implemented in hardware, and vice versa. Further, any functionality implemented in the vehicle 302 can be implemented in the computing device(s) 336, or another component (and vice versa).

In at least one example, the sensor system(s) 306 can include time of flight sensors, lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 306 can include multiple instances of each of these or other types of sensors. For instance, the time of flight sensors can include individual time of flight sensors located at the corners, front, back, sides, and/or top of the vehicle 302. As another example, the camera sensors can include multiple cameras disposed at various locations about the exterior and/or interior of the vehicle 302. The sensor system(s) 306 can provide input to the vehicle computing device(s) 304. Additionally or alternatively, the sensor system(s) 306 can send sensor data, via the one or more networks 334, to the one or more computing device(s) 336 at a particular frequency, after a lapse of a predetermined period of time, in near real-time, etc.

The vehicle 302 can also include one or more emitters 308 for emitting light and/or sound, as described above. The emitters 308 in this example include interior audio and visual emitters to communicate with passengers of the vehicle 302. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 308 in this example also include exterior emitters. By way of example and not limitation, the exterior emitters in this example include lights to signal a direction of travel or other indicators of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 302 can also include one or more communication connection(s) 310 that enable communication between the vehicle 302 and one or more other local or remote computing device(s). For instance, the communication connection(s) 310 can facilitate communication with other local computing device(s) on the vehicle 302 and/or the drive system(s) 314. Also, the communication connection(s) 310 can allow the vehicle to communicate with other nearby computing device(s) (e.g., other nearby vehicles, traffic signals, etc.). The communications connection(s) 310 also enable the vehicle 302 to communicate with a remote teleoperation computing device or other remote services.

The communications connection(s) 310 can include physical and/or logical interfaces for connecting the vehicle computing device(s) 304 to another computing device or a network, such as network(s) 334. For example, the communications connection(s) 310 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 302 can include one or more drive systems 314. In some examples, the vehicle 302 can have a single drive system 314. In at least one example, if the vehicle 302 has multiple drive systems 314, individual drive systems 314 can be positioned on opposite ends of the vehicle 302 (e.g., the front and the rear, etc.). In at least one example, the drive system(s) 314 can include one or more sensor systems to detect conditions of the drive system(s) 314 and/or the surroundings of the vehicle 302. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 314. In some cases, the sensor system(s) on the drive system(s) 314 can overlap or supplement corresponding systems of the vehicle 302 (e.g., sensor system(s) 306).

The drive system(s) 314 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 314 can include a drive system controller, which can receive and preprocess data from the sensor system(s) and control operation of the various vehicle systems. In some examples, the drive system controller can include one or more processors and memory communicatively coupled with the one or more processors. The memory can store one or more components to perform various functionalities of the drive system(s) 314. Furthermore, the drive system(s) 314 also include one or more communication connection(s) that enable communication by the respective drive system with one or more other local or remote computing device(s).

In at least one example, the direct connection 312 can provide a physical interface to couple the one or more drive system(s) 314 with the body of the vehicle 302. For example, the direct connection 312 can allow the transfer of energy, fluids, air, data, etc. between the drive system(s) 314 and the vehicle. In some instances, the direct connection 312 can further releasably secure the drive system(s) 314 to the body of the vehicle 302.

In at least one example, the localization component 320, the perception component 322, the one or more maps 324, the one or more system controllers 326, the prediction component 328, the data processing component 330, and the planning component 332 can process sensor data, as described above, and can send their respective outputs, over the one or more network(s) 334, to one or more computing device(s) 336. In at least one example, the localization component 320, the one or more maps 324, the one or more system controllers 326, the prediction component 328, the data processing component 330, and the planning component 332 can send their respective outputs to the one or more computing device(s) 336 at a particular frequency, after a lapse of a predetermined period of time, in near real-time, etc.

In some examples, the vehicle 302 can send sensor data to one or more computing device(s) 336 via the network(s) 334. In some examples, the vehicle 302 can send raw sensor data to the computing device(s) 336. In other examples, the vehicle 302 can send processed sensor data and/or representations of sensor data to the computing device(s) 336. In some examples, the vehicle 302 can send sensor data to the computing device(s) 336 at a particular frequency, after a lapse of a predetermined period of time, in near real-time, etc. In some cases, the vehicle 302 can send sensor data (raw or processed) to the computing device(s) 336 as one or more log files.

The computing device(s) 336 can include processor(s) 338, a user interface 340, such as user interface 106, and/or user interface 206, and a memory 342 and communication connection(s) 310. In some examples, the user interface 340 can include functionality to generate maps of various resolutions and/or output a representation of the vehicle navigating in an environment. The user interface 340 can further include functionality to provide one or more controls that receive an input to guide the vehicle 302 (by way of determining a reference trajectory, for instance). In some examples, the input to the user interface 340 can indicate a velocity and a direction for the vehicle 302 to follow at a future time.

In some examples, the input to the user interface 340 can be received via a steering controller or a deceleration controller in communication with the user interface 340. For instance, the steering controller may comprise a steering wheel or other interface configured to control steering as part of the input. In some examples, an acceleration controller may comprise a deceleration pedal, a brake pedal, or other interface configured to control deceleration as part of the input. In some examples, a single controller can provide steering, deceleration, and braking control inputs to the user interface.

In some examples, the planning component 332 may receive, from the computing device(s) 336, an instruction to stop movement of the vehicle 302. The instruction may include steering, braking, and/or deceleration information as non-limiting examples, though other controls (of internal and/or external components) of the vehicle are contemplated.

In some examples, the prediction component 328 may be coupled with the perception component 322 to determine that the instruction is associated with stopping the autonomous vehicle in a no-stopping area that is undesirable for the vehicle 302 to stop. For example, the perception component 322 may determine the no-stopping area based on sensor data received from the sensor system(s) 306. Example no-stopping areas may include a junction, a crosswalk, a railroad crossing, a construction zone, a fire lane, onramp or offramp entrance or exit, an entrance to a parking lot, a bus lane, and/or the like. The prediction component 328 may further determine whether the instruction is associated with stopping the vehicle 302 in the no-stopping area. In response to determining that the instruction is associated with stopping the vehicle 302 in the no-stopping area, the planning component 332 may determine to continue movement of the vehicle 302. The planning component 332 may further identify a stopping location that is at least partially outside of the no-stopping area and control the vehicle 302 to instead stop at the stopping location.

In some examples, the prediction component 328 may determine that the instruction is associated with stopping the vehicle 302 in the no-stopping area based on a location, a speed, and a deceleration rate associated with the vehicle 302. For example, the prediction component 328 may determine a first location and a speed associated with the vehicle 302. The prediction component 328 may determine a second location associated with stopping the vehicle 302 based on the first location, the speed, and a deceleration rate. The prediction component 328 may further determine whether the second location is located in the no-stopping area.

In some examples, the planning component 332 may generate a vehicle trajectory based on sensor data representative of an environment of the vehicle 302. For example, the prediction component 328 may be coupled with the perception component 322 to determine, based at least in part on sensor data representative of the environment of the vehicle 302, an object trajectory associated with an object operating in the environment. Based at least in part on a determination that the object traveling on the object trajectory is relevant to the vehicle 302, the perception component 322 may determine an area associated with the object. The planning component 332 may generate, based at least in part on the no-stopping area and the area associated with the object, a vehicle trajectory from a first location (e.g., a current location) of the vehicle 302 to the stopping location. The system may further control the vehicle 302 based at least in part on the vehicle trajectory.

In some examples, the planning component 332 may generate another vehicle trajectory based on determining an object indicated in sensor data is an unclassified or classified hazardous object. In some examples, the perception component 322 may determine the object indicated in the sensor data is a classified hazardous object based on log data. For example, the perception component 322 may determine the object indicated in the sensor data is a traffic cone and a classifier of the perception component 322 may classify the object to be a classified hazardous object based on log data, machine learned models, and/or the like. In some examples, the perception component 322 may determine the object indicated in the sensor data is an unclassified object. An unclassified object can include an object that is unidentifiable and/or identified with a low confidence classification by the classifier of the perception component 322. For example, a car with a mattress mounted on the roof may modify a shape of the car such that it is identified with a low confidence classification by the classifier of the perception component 322. As such, the perception component 322 may determine that the object is an unclassified object. For another example, a vehicle may have an additional object, such as wood, rebar, or the like protruding from a portion of the vehicle. The perception component 322 may determine that the protrusion (e.g., the additional object) is unidentifiable and may render the object unclassified. In response to determining that the object is an unclassified object and/or is classified as a hazardous object, the planning component 332 generate an expanded area based on the area associated with the object. The planning component 332 may further generate the vehicle trajectory based on the expanded area and control the vehicle 302 based on the vehicle trajectory.

In some examples, the vehicle 302 may generate a message indicating that the instruction is associated with the no-stopping area and send the message to the computing device(s) 336 via the network(s) 334. As an example, the vehicle 302 may generate a message that reads "the instruction is associated with a junction and the vehicle 302 is going to continue movement to void stopping at the junction." The vehicle 302 may send the message to the computing device(s) 336 and cause the message to be presented on a display of the computing device(s) 336.

In some instances, aspects of some or all of the components discussed herein may include any models, techniques, and/or machine learned techniques. For example, in some instances, the components in the memory 318 (and the memory 342) may be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The processor(s) 316 of the vehicle 302 and the processor(s) 338 of the computing device(s) 336 can be any suitable processor capable of executing instructions to process data and perform operations as described herein. By way of example and not limitation, the processor(s) 316 and 338 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 318 and 342 are examples of non-transitory computer-readable media. The memory 318 and 342 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying FIGURES are merely examples that are related to the discussion herein.

It should be noted that while FIG. 3 is illustrated as a distributed system, in alternative examples, components of the vehicle 302 can be associated with the computing device(s) 336 and/or components of the computing device(s) 336 can be associated with the vehicle 302. That is, the vehicle 302 can perform one or more of the functions associated with the computing device(s) 336, and vice versa. Further, aspects of the prediction component 328 (and subcomponents) can be performed on any of the devices discussed herein.

Figure 4:
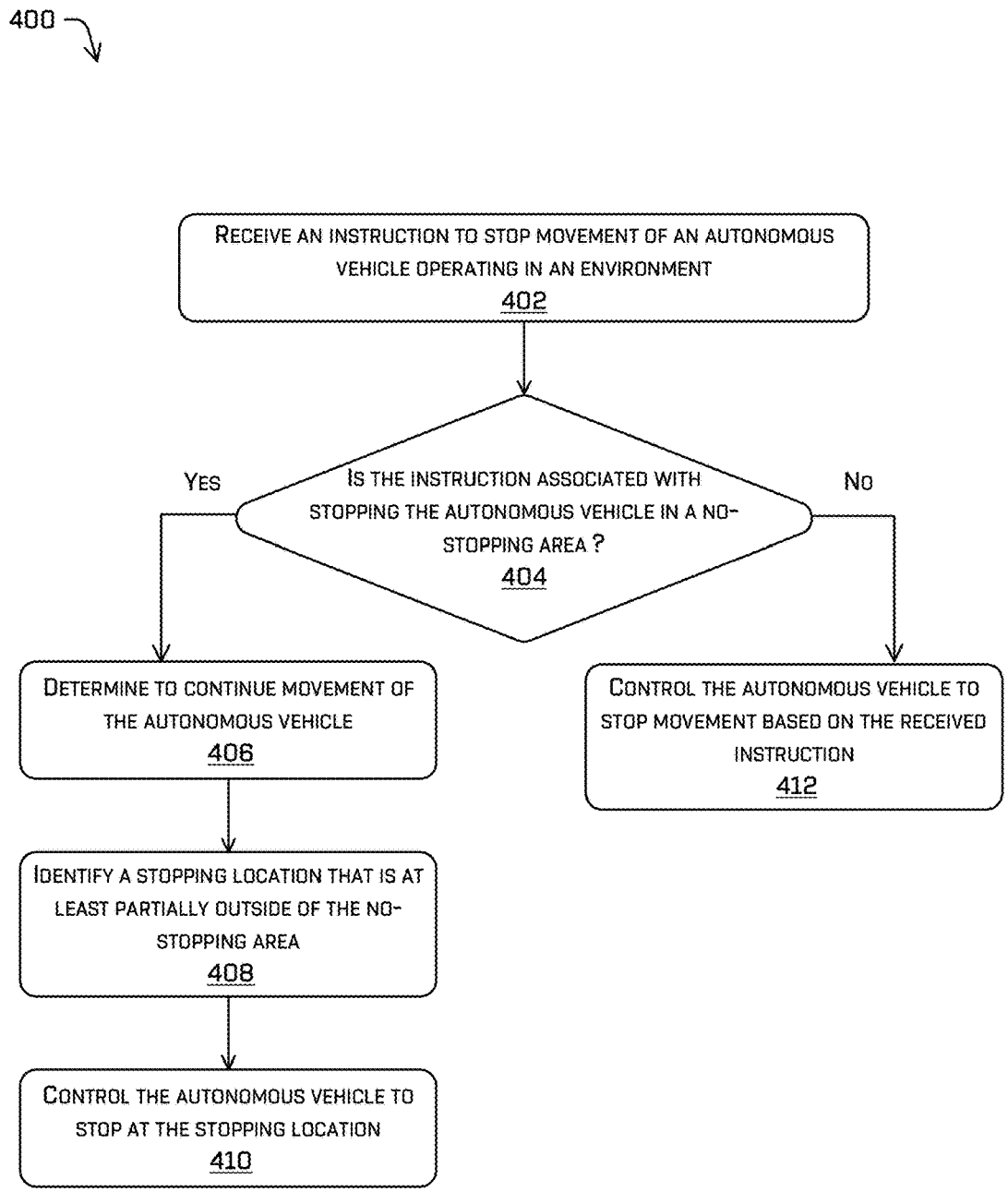
FIG. 4 is a flowchart depicting an example process for validating and correcting stopping signals for an autonomous vehicle.
Figure 5:
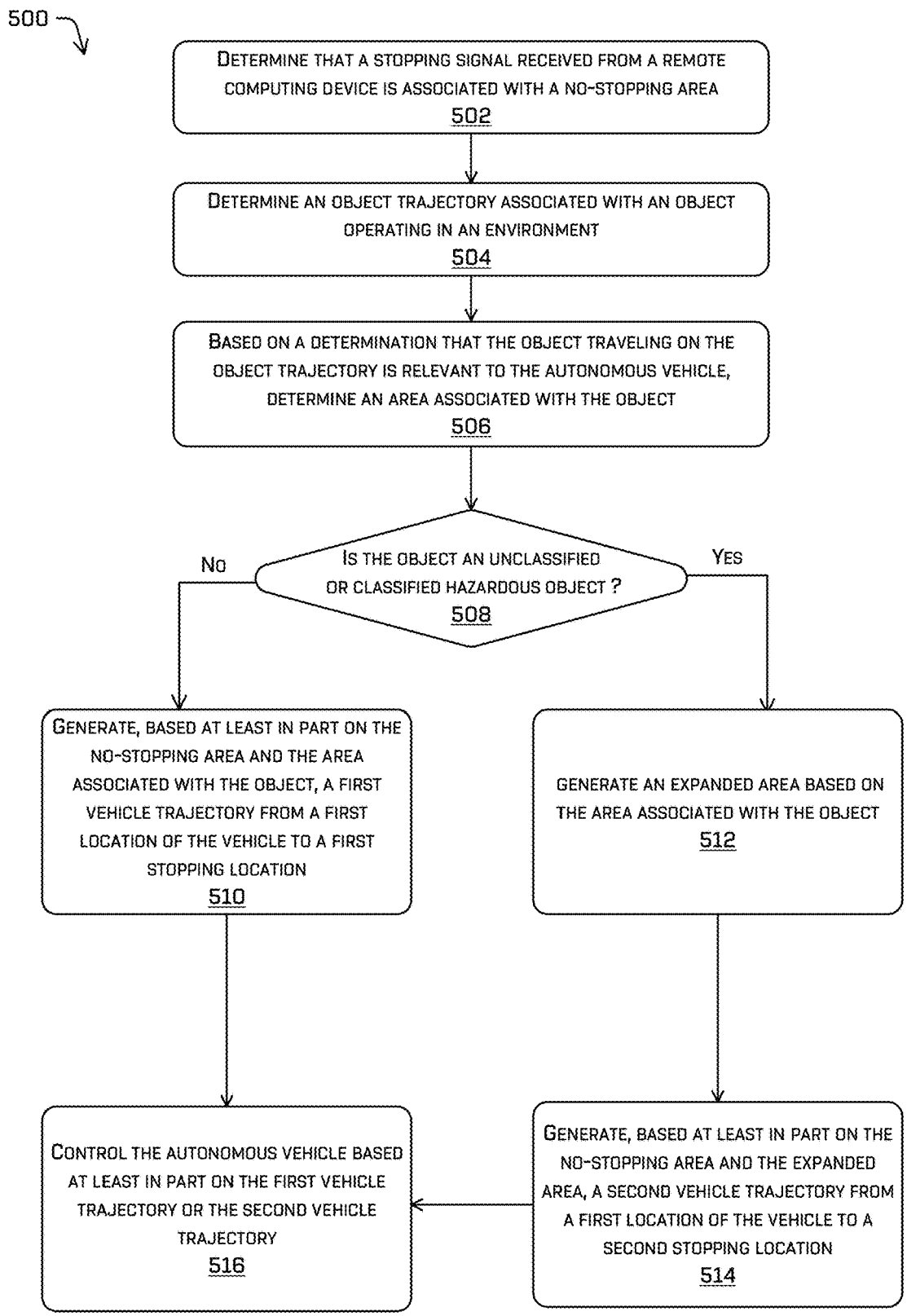
FIG. 5 is a flowchart depicting an example process for modifying an area associated with a detected object based on a classification.

FIGS. 4 and 5 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

FIG. 4 is a flowchart depicting an example process 400 for validating and correcting teleoperation for an autonomous vehicle. Some or all of the process 400 may be performed by one or more components in FIG. 3, as described herein. For example, some or all of process 400 may be performed by vehicle computing system 120, vehicle computing system 220, and/or the vehicle computing device(s) 304. Further, any of the operations described in the example process 400 may be executed in parallel, in a different order than depicted in the process 400, omit any of the operations of the depicted process 400, and/or be combined with any of the operations discussed herein.

At operation 402, the process 400 can include receiving, from a remote computing device, an instruction to stop movement of an autonomous vehicle in an environment. In some examples, the instruction may include steering, braking, and/or deceleration information as non-limiting examples, though other controls (of internal and/or external components) of the autonomous vehicle are contemplated. In some examples, the operation 402 can be performed by the autonomous vehicle as the vehicle traverses an environment.

At operation 404, the process 400 can include determining whether the instruction is associated with stopping the autonomous vehicle in a no-stopping area. In some examples, the no-stopping area is designated, in the map data, as including a drivable surface. Examples of the no-stopping area include, but not limited to, a junction, a crosswalk, a railroad crossing, a construction zone, a fire lane, an onramp or offramp entrance or exit, an entrance to a parking lot, a bus lane, and/or the like. In some examples, the no-stopping area may be determined based at least in part on sensor data of the environment (e.g., sensor data received from one or more sensors associated with the autonomous vehicle, sensor data received from one or more remote sensors mounted in an environment of the autonomous vehicle, etc.), log data indicative of no-stopping areas, and/or map data.

In some examples, the operation 404 can include determining a first location associated with the autonomous vehicle and determining a speed associated with the autonomous vehicle. The operation 404 can further include determining, based on the first location, the speed, and a deceleration rate, a second location associated with stopping the vehicle. The operation 404 can further include determining that the second location is located in the no-stopping area.

If the instruction is associated with stopping the autonomous vehicle in a no-stopping area (e.g., "yes" in operation 404), the process 400 continues to operation 406. At the operation 406, the process 400 can include determining to continue movement of the autonomous vehicle. In some examples, the process 400 can further include, in response to determining that the instruction is associated with stopping the autonomous vehicle in the no-stopping area, generating a message indicating that the instruction is associated with stopping the vehicle in the no-stopping area and sending the message to the remote computing device.

At operation 408, the process 400 can include identifying a stopping location that is at least partially outside of the no-stopping area. As discussed above, the stopping location includes a location at which, regardless of a position and/or orientation of the vehicle, the vehicle will be entirely out of the no-stopping area At operation 410, the process 400 can include controlling the autonomous vehicle to instead stop at the stopping location.

If the instruction is not associated with stopping the autonomous vehicle in a no-stopping area (e.g., "no" in operation 404), the process 400 continues to operation 412. At operation 412, the process 400 can include control the autonomous vehicle to stop movement based on the received instruction.

FIG. 5 is a flowchart depicting an example process 500 for modifying an area associated with a detected object based on a classification. Some or all of the process 500 may be performed by one or more components in FIG. 3, as described herein. For example, some or all of process 500 may be performed by the vehicle computing device(s) 304. Further, any of the operations described in the example process 500 may be executed in parallel, in a different order than depicted in the process 500, omit any of the operations of the depicted process 500, and/or be combined with any of the operations discussed herein.

At operation 502, the process 500 can include determining that a stopping signal received from a remote computing device is associated with a no-stopping area. In some examples, the remote computing device may include a computing device associated with a teleoperator configured to provide remote guidance to the vehicle.

At operation 504, the process 500 can include determining an object trajectory associated with an object operating in an environment. In at least one example, the process 500 may determine the object trajectory utilizing techniques such as those described in U.S. patent application Ser. No. 16/151,607 filed Oct. 4, 2018 and entitled "Trajectory Prediction on Top-Down Scenes," and Ser. No. 15/807,521 filed Nov. 8, 2017 and entitled "Probabilistic Heat Maps for Behavior Prediction.

At operation 506, the process 500 can include determining an area associated with the object based on a determination that the object traveling on the object trajectory is relevant to the autonomous vehicle. For example, the operation 506 can include determining an object size associated with the object based on sensor data representative of an environment of the autonomous vehicle. The operation 506 can may further include generating the area on a map, which indicates the size and/or volume of the object (e.g., a length, a width, and/or a height in meters).

At operation 508, the process 500 can include determining whether the object is an unclassified or classified hazardous object. In some examples, the operation 506 can include determining whether the object indicated in sensor data is a classified hazardous object, optionally based on map data. For example, a system may determine the object indicated in the sensor data is a traffic cone and a classifier of the system may classify the object as hazardous object based on log data, machine learned models, and/or the like. In some examples, the operation 506 can include determining the object indicated in the sensor data as an unclassified object. An unclassified object can include an object in which at least a portion of the object is unidentifiable and/or identified with a low confidence classification by the classifier of the system. For example, a car with a mattress mounted on the roof may modify a shape of the car such that it is unidentifiable or identified with a low confidence classification to the classifier. As such, the system may determine that the object is an unclassified object. For another example, a vehicle may have an additional object, such as wood, rebar, or the like protruding from a portion of the vehicle. The system may determine that the protrusion (e.g., the additional object) is unidentifiable and/or identified with a low confidence classification and may render the object unclassified.

If the object is not an unclassified object or classified as a hazardous object (e.g., "no" in operation 508), the process 500 continues to operation 510. At operation 510, the process 500 can include generating, based at least in part on the no-stopping area and the area associated with the object, a first vehicle trajectory from a first location (e.g., a current location) of the autonomous vehicle to a first stopping location that is at least partially outside of the no-stopping area.

If the object is an unclassified object or classified as a hazardous object (e.g., "yes" in operation 506), the process 500 continues to operation 512. At operation 512, the process 500 can include, in response to determining that the object is an unclassified object or classified as a hazardous object, generating an expanded area based on the area associated with the object. In one example, the expanded area may be a certain percentage larger than the area associated with the object.

At operation 514, the process 500 can include generating, based at least in part on the no-stopping area and the expanded area, a second vehicle trajectory from a first location (e.g., a current location) of the autonomous vehicle to a second stopping location that is at least partially outside of the no-stopping area.

At operation 516, the process 500 can include controlling the autonomous vehicle based at least in part on the first vehicle trajectory or the second vehicle trajectory.

Example Clauses

A: A system comprising: one or more processors; and one or more non-transitory computer-readable media storing instructions executable by the one or more processors, wherein the instructions, when executed, cause the system to perform operations comprising: receiving, from a remote computing device, an instruction to stop movement of an autonomous vehicle operating in an environment; determining, by a controller of the autonomous vehicle, and based at least in part on map data associated with the environment, that the instruction is associated with stopping the autonomous vehicle in a no-stopping area that is designated, in the map data, as including a drivable surface; in response to determining that the instruction is associated with stopping the autonomous vehicle in the no-stopping area, determining to continue movement of the autonomous vehicle beyond the no-stopping area; identifying a stopping location that is at least partially outside of the no-stopping area; and in response to determining that the instruction is associated with stopping the autonomous vehicle in the no-stopping area, controlling, by the controller, the autonomous vehicle to instead stop at the stopping location.

B: The system as paragraph A recites, the operations further comprising: determining, based at least in part on sensor data of an environment and the map data, the no-stopping area, wherein the no-stopping area comprises at least one of: a junction, a crosswalk, a railroad crossing, a construction zone, a fire lane, or a bus lane.

C: The system as paragraph A or B recites, wherein determining that the instruction is associated with stopping the autonomous vehicle in the no-stopping area comprises: determining a first location associated with the autonomous vehicle; determining a speed associated with the autonomous vehicle; determining, based on the first location, the speed, and a deceleration rate, a second location associated with stopping the autonomous vehicle; and determining that the second location is located in the no-stopping area.

D: The system as any of paragraphs A-C recite, wherein determining that the instruction is associated with stopping the vehicle in the no-stopping area is further based at least in part on a latency associated one or more messages from the remote computing device to the controller.

E: The system as any of paragraphs A-D recite, the operations further comprising: in response to determining that the instruction is associated with stopping the autonomous vehicle in the no-stopping area, generating a message indicating that continued movement of the vehicle after receiving the instruction is due to determining that the instruction is associated with stopping the vehicle in the no-stopping area, the message including the stopping location that is at least partially outside the no-stopping area; and sending the message to the remote computing device.

F: The system as any of paragraphs A-E recite, the operations further comprising: determining, based at least in part on sensor data representative of the environment, an object trajectory associated with an object operating in the environment; based at least in part on a determination that the object traveling on the object trajectory is relevant to the autonomous vehicle, determining an area associated with the object; generating, based at least in part on the no-stopping area and the area associated with the object, a vehicle trajectory from a first location of the autonomous vehicle to the stopping location; and controlling the autonomous vehicle based at least in part on the vehicle trajectory.

G: The system as paragraph F recites, the operations further comprising: determining, based on the sensor data, that the object is an unclassified or classified hazardous object; and in response to determining that the object is the unclassified or classified hazardous object, generating, based on the area associated with the object, an expanded area, wherein generating the vehicle trajectory is further based on the expanded area.

H: A method comprising: receiving, from a remote computing device, an instruction to stop movement of an autonomous vehicle operating in an environment; determining, based at least in part on map data of the environment, that the instruction is associated with stopping the autonomous vehicle in a no-stopping area that is designated, in the map data, as including a drivable surface; identifying a stopping location that is at least partially outside of the no-stopping area; in response to determining that the instruction is associated with stopping the autonomous vehicle in the no-stopping area, controlling the autonomous vehicle to continue movement through the no-stopping area to the stopping location.

I: The method as paragraph H recites, further comprising: determining, based at least in part on sensor data of the environment and the map data, the no-stopping area, wherein the no-stopping area comprises at least one of: a junction, a crosswalk, a railroad crossing, a construction zone, a fire lane, or a bus lane.

J: The method as paragraph H or I recites, wherein determining that the instruction is associated with stopping the autonomous vehicle in the no-stopping area comprises: determining a first location associated with the autonomous vehicle; determining a speed associated with the autonomous vehicle; determining, based on the first location, the speed, and a deceleration rate, a second location associated with stopping the autonomous vehicle; and determining that the second location is located in the no-stopping area.

K: The method as any of paragraphs H-J recite, wherein determining that the instruction is associated with stopping the vehicle in the no-stopping area is further based at least in part on a latency associated with one or more messages from the remote computing device to the controller.

L: The method as any of paragraphs H-K recite, further comprising: in response to determining that the instruction is associated with stopping the autonomous vehicle in the no-stopping area, generating a message indicating that continued movement of the vehicle after receiving the instruction is due to determining that the instruction is associated with stopping the vehicle in the no-stopping area, the message including the stopping location that is at least partially outside the no-stopping area; and sending the message to the remote computing device.

M: The method as any of paragraphs H-L recite, further comprising: determining, based at least in part on sensor data representative of the environment, an object trajectory associated with an object operating in the environment; based at least in part on a determination that the object traveling on the object trajectory is relevant to the autonomous vehicle, determining an area associated with the object; generating, based at least in part on the no-stopping area and the area associated with the object, a vehicle trajectory from a first location of the autonomous vehicle to the stopping location; and controlling the autonomous vehicle based at least in part on the vehicle trajectory.

N: The method as paragraph M recites, further comprising: determining, based on the sensor data, that the object is an unclassified or classified hazardous object; and in response to determining that the object is the unclassified or classified hazardous object, generating, based on the area associated with the object, an expanded area, wherein generating the vehicle trajectory is further based on the expanded area.

O: A non-transitory computer readable medium storing instructions executable by a processor, wherein the instructions, when executed, cause the processor to perform operations comprising: receiving, from a remote computing device, an instruction to stop movement of an autonomous vehicle operating in an environment; determining that the instruction is associated with stopping the autonomous vehicle in a no-stopping area including a drivable surface; identifying a stopping location that is at least partially outside of the no-stopping area; and in response to determining that the instruction is associated with stopping the autonomous vehicle in the no-stopping area, controlling the autonomous vehicle to continue movement through the no-stopping area to the stopping location.

P: The one or more non-transitory computer-readable media as paragraph O recites, the operations further comprising: determining, based at least in part on sensor data of the environment or map data, the no-stopping area, wherein the no-stopping area comprises at least one of: a junction, a crosswalk, a railroad crossing, a construction zone, a fire lane, or a bus lane.

Q: The one or more non-transitory computer-readable media as paragraph O or P recites, wherein determining that the instruction is associated with stopping the autonomous vehicle in the no-stopping area comprises: determining a first location associated with the autonomous vehicle; determining a speed associated with the autonomous vehicle; determining, based on the first location, the speed, and a deceleration rate, a second location associated with stopping the autonomous vehicle; and determining that the second location is located in the no-stopping area.

R: The one or more non-transitory computer-readable media as any of paragraphs O-Q recite, wherein determining that the instruction is associated with stopping the vehicle in the no-stopping area is further based at least in part on a latency associated with one or more messages from the remote computing device to the controller.

S: The one or more non-transitory computer-readable media as any of paragraphs O-R recite, the operations further comprising: determining, based at least in part on sensor data representative of the environment, an object trajectory associated with an object operating in the environment; based at least in part on a determination that the object traveling on the object trajectory is relevant to the autonomous vehicle, determining an area associated with the object; generating, based at least in part on the no-stopping area and the area associated with the object, a vehicle trajectory from a first location of the autonomous vehicle to the stopping location; and controlling the autonomous vehicle based at least in part on the vehicle trajectory.

T: The one or more non-transitory computer-readable media as paragraph S recites, the operations further comprising: determining, based on the sensor data, that the object is an unclassified or classified hazardous object; and in response to determining that the object is the unclassified or classified hazardous object, generating, based on the area associated with the object, an expanded area, wherein generating the vehicle trajectory is further based on the expanded area.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
receiving, from a remote computing device, an instruction to stop movement of an autonomous vehicle operating in an environment;
determining, by a controller of the autonomous vehicle, and based at least in part on map data associated with the environment and a latency associated with one or more messages from the remote computing device to the controller, that the instruction is associated with stopping the autonomous vehicle in a no-stopping area that is designated, in the map data, as including a drivable surface;
in response to determining that the instruction is associated with stopping the autonomous vehicle in the no-stopping area, determining to continue movement of the autonomous vehicle beyond the no-stopping area;
identifying a stopping location that is at least partially outside of the no-stopping area; and
in response to determining that the instruction is associated with stopping the autonomous vehicle in the no-stopping area, controlling, by the controller, the autonomous vehicle to instead stop at the stopping location.

2. The system of claim 1, the operations further comprising:
determining, based at least in part on sensor data of an environment and the map data, the no-stopping area, wherein the no-stopping area comprises at least one of: a junction, a crosswalk, a railroad crossing, a construction zone, a fire lane, or a bus lane.

3. The system of claim 1, wherein determining that the instruction is associated with stopping the autonomous vehicle in the no-stopping area comprises:
determining a first location associated with the autonomous vehicle;
determining a speed associated with the autonomous vehicle;
determining, based on the first location, the speed, and a deceleration rate, a second location associated with stopping the autonomous vehicle; and
determining that the second location is located in the no-stopping area.

4. The system of claim 1, the operations further comprising:
in response to determining that the instruction is associated with stopping the autonomous vehicle in the no-stopping area, generating a message indicating that continued movement of the autonomous vehicle after receiving the instruction is due to determining that the instruction is associated with stopping the autonomous vehicle in the no-stopping area, the message including the stopping location that is at least partially outside the no-stopping area; and
sending the message to the remote computing device.

5. The system of claim 1, the operations further comprising:
determining, based at least in part on sensor data representative of the environment, an object trajectory associated with an object operating in the environment;
based at least in part on a determination that the object traveling on the object trajectory is relevant to the autonomous vehicle, determining an area associated with the object;
generating, based at least in part on the no-stopping area and the area associated with the object, a vehicle trajectory from a first location of the autonomous vehicle to the stopping location; and
controlling the autonomous vehicle based at least in part on the vehicle trajectory.

6. The system of claim 5, the operations further comprising:
determining, based on the sensor data, that the object is an unclassified or classified hazardous object; and
in response to determining that the object is the unclassified or classified hazardous object, generating, based on the area associated with the object, an expanded area,
wherein generating the vehicle trajectory is further based on the expanded area.

7. The system of claim 1, wherein determining that the instruction is associated with stopping the autonomous vehicle in the no-stopping area comprises:
comparing the latency associated with one or more messages from the remote computing device to the controller with a latency threshold;
determining that the latency is greater than or equal to the latency threshold; and
determining that the instruction is associated with stopping the vehicle in the no-stopping area based at least in part on the determination that the latency is greater than or equal to the latency threshold.

8. The system of claim 1, wherein determining that the instruction is associated with stopping the autonomous vehicle in the no-stopping area comprises:
comparing the latency associated with one or more messages from the remote computing device to the controller with a latency threshold;
determining that the latency is less than the latency threshold; and
determining that the instruction is associated with stopping the vehicle in the no-stopping area based at least in part on: a location associated with the autonomous vehicle when the one or more messages from the remote computing device is received, a speed associated with the autonomous vehicle when the one or more messages from the remote computing device is received, and a deceleration rate associated with the autonomous vehicle.

9. A method comprising:
receiving, from a remote computing device, an instruction to stop movement of an autonomous vehicle operating in an environment;
determining, based at least in part on map data of the environment and a latency associated with one or more messages from the remote computing device to a controller of the autonomous vehicle, that the instruction is associated with stopping the autonomous vehicle in a no-stopping area that is designated, in the map data, as including a drivable surface;
identifying a stopping location that is at least partially outside of the no-stopping area; and
in response to determining that the instruction is associated with stopping the autonomous vehicle in the no-stopping area, controlling the autonomous vehicle to continue movement through the no-stopping area to the stopping location.

10. The method of claim 9, further comprising:
determining, based at least in part on sensor data of the environment and the map data, the no-stopping area,
wherein the no-stopping area comprises at least one of: a junction, a crosswalk, a railroad crossing, a construction zone, a fire lane, or a bus lane.

11. The method of claim 9, wherein determining that the instruction is associated with stopping the autonomous vehicle in the no-stopping area comprises:
determining a first location associated with the autonomous vehicle;
determining a speed associated with the autonomous vehicle;
determining, based on the first location, the speed, and a deceleration rate, a second location associated with stopping the autonomous vehicle; and
determining that the second location is located in the no-stopping area.

12. The method of claim 9, further comprising:
in response to determining that the instruction is associated with stopping the autonomous vehicle in the no-stopping area, generating a message indicating that continued movement of the autonomous vehicle after receiving the instruction is due to determining that the instruction is associated with stopping the autonomous vehicle in the no-stopping area, the message including the stopping location that is at least partially outside the no-stopping area; and
sending the message to the remote computing device.

13. The method of claim 9, further comprising:
determining, based at least in part on sensor data representative of the environment, an object trajectory associated with an object operating in the environment;
based at least in part on a determination that the object traveling on the object trajectory is relevant to the autonomous vehicle, determining an area associated with the object;
generating, based at least in part on the no-stopping area and the area associated with the object, a vehicle trajectory from a first location of the autonomous vehicle to the stopping location; and
controlling the autonomous vehicle based at least in part on the vehicle trajectory.

14. The method of claim 13, further comprising:
determining, based on the sensor data, that the object is an unclassified or classified hazardous object; and
in response to determining that the object is the unclassified or classified hazardous object, generating, based on the area associated with the object, an expanded area, wherein generating the vehicle trajectory is further based on the expanded area.

15. A non-transitory computer-readable medium storing instructions executable by a processor, wherein the instructions, when executed, cause the processor to perform operations comprising:
receiving, from a remote computing device, an instruction to stop movement of an autonomous vehicle operating in an environment;
determining, based at least in part on a latency associated with one or more messages from the remote computing device to a controller of the autonomous vehicle, that the instruction is associated with stopping the autonomous vehicle in a no-stopping area including a drivable surface;
identifying a stopping location that is at least partially outside of the no-stopping area; and
in response to determining that the instruction is associated with stopping the autonomous vehicle in the no-stopping area, controlling the autonomous vehicle to continue movement through the no-stopping area to the stopping location.

16. The non-transitory computer-readable medium of claim 15, the operations further comprising:
determining, based at least in part on sensor data of the environment or map data, the no-stopping area,
wherein the no-stopping area comprises at least one of: a junction, a crosswalk, a railroad crossing, a construction zone, a fire lane, or a bus lane.

17. The non-transitory computer-readable medium of claim 15, wherein
determining that the instruction is associated with stopping the autonomous vehicle in the no-stopping area comprises:
determining a first location associated with the autonomous vehicle;
determining a speed associated with the autonomous vehicle;
determining, based on the first location, the speed, and a deceleration rate, a second location associated with stopping the autonomous vehicle; and
determining that the second location is located in the no-stopping area.

18. The non-transitory computer-readable medium of claim 15, the operations further comprising:
determining, based at least in part on sensor data representative of the environment, an object trajectory associated with an object operating in the environment;

based at least in part on a determination that the object traveling on the object trajectory is relevant to the autonomous vehicle, determining an area associated with the object;

generating, based at least in part on the no-stopping area and the area associated with the object, a vehicle trajectory from a first location of the autonomous vehicle to the stopping location; and controlling the autonomous vehicle based at least in part on the vehicle trajectory.

19. The non-transitory computer-readable medium of claim 18, the operations further comprising:

determining, based on the sensor data, that the object is an unclassified or classified hazardous object; and in response to determining that the object is the unclassified or classified hazardous object, generating, based on the area associated with the object, an expanded area, wherein generating the vehicle trajectory is further based on the expanded area.

20. The non-transitory computer-readable medium of claim 15, the operations further comprising:

in response to determining that the instruction is associated with stopping the autonomous vehicle in the no-stopping area, generating a message indicating that continued movement of the autonomous vehicle after receiving the instruction is due to determining that the instruction is associated with stopping the autonomous vehicle in the no-stopping area, the message including the stopping location that is at least partially outside the no-stopping area; and sending the message to the remote computing device.

* * * * *